United States Patent [19]

Robey

[11] Patent Number: 4,919,445

[45] Date of Patent: Apr. 24, 1990

[54] TRAILER REAR WHEEL SLIDABLE MOUNTING ASSEMBLY

[76] Inventor: Randy C. Robey, P.O. Box 972, Haskell, Okla. 74436

[21] Appl. No.: 315,062

[22] Filed: Feb. 24, 1989

[51] Int. Cl.$^5$ .............................................. B60P 1/04
[52] U.S. Cl. ................................. 280/149.2; 280/80.1
[58] Field of Search ............ 280/81.1, 426, 29, 149.2, 280/80.1, 418.1

[56] References Cited

U.S. PATENT DOCUMENTS

| | | | |
|---|---|---|---|
| 3,963,259 | 6/1976 | Massey | 280/682 |
| 4,125,198 | 11/1978 | Landoll | 280/43 |
| 4,231,710 | 11/1980 | Landoll | 280/43.23 |
| 4,353,565 | 10/1982 | Smith et al. | 280/149.2 |
| 4,365,820 | 12/1982 | Rush | 280/149.2 |
| 4,580,805 | 8/1986 | Bertolini | 280/149.2 |

Primary Examiner—Richard A. Bertsch
Attorney, Agent, or Firm—Robert K. Rhea

[57] ABSTRACT

A slider for repositioning the rear wheels of a tractor trailer unit includes a carriage having parallel lateral box members longitudinally slidably nested by longitudinal extending trailer bed rails. The rails are normally anchored to the box members by pins extending horizontally through aligned apertures. The box members contain roller supporting carriages move longitudinally of the trailer by pressure cylinders which move roller pairs of rollers up an incline to force upper pairs of rollers through openings in the box members top surfaces into trailer bed lifting antifriction contact with the trailer rails thus permitting longitudinal movement of the trailer bed relative to the trailer rear wheel undercarriage while the latter is in rear wheel brake locked position.

8 Claims, 2 Drawing Sheets

TRAILER REAR WHEEL SLIDABLE MOUNTING ASSEMBLY

BACKGROUND OF THE INVENTION

1. Field of the Invention

This invention relates to transport truck trailers and more particularly to a slidable mounting assembly for the rear wheels thereof.

Relatively large size transport truck trailers are customarily provided with a rear wheel and axle subframe supported by the trailer rear wheels with the subframe longitudinally underlying the trailer bed rails in supporting relation. The rear wheel subframe is longitudinally slidable relative to the trailer bed rails and is normally secured thereto by locking pins projecting horizontally through cooperating aligned transverse openings formed in the rear wheel subframe and trailer bed supporting rails.

In practice, the rear wheel subframe is moved relative to the trailer to equalize or distribute the load on the trailer relative to the trailer wheels and truck tractor wheels. In order to reposition the trailer wheels, either forwardly or rearwardly, relative to the trailer bed, the locking pins are temporarily withdrawn and the trailer is backed for contact of the trailer rear wheel assembly with a solid object below the level of the trailer bed. Alternatively, the trailer is forced in a rearward direction by the truck tractor which moves the trailer bed relative to the rear wheel subframe. In the event the rear wheels must be moved rearwardly relative to the trailer bed, the rear wheel brakes are usually "set" so that the wheels remain stationary relative to their position on a supporting surface while the truck tractor moves the trailer bed forwardly relative to the position of the rear wheels. However, this common practice of repositioning the wheels relative to the trailer is not entirely satisfactory. The repeated bumping and banging of the trailer components lead to damage to the trailer, its undercarriage or components of the load carried thereby. Further, such sliding action of the rear wheels relative to the trailer is a time consuming operation particularly when attempting to align the position of the locking pin receiving holes to secure the rear wheels in the new position relative to the trailer. Thus, it seems readily apparent that there is a need for an apparatus and system for more easily and quickly facilitating the repositioning of the trailer supporting wheels relative to the trailer unit.

2. Description of the Prior Art

I do not know of any patent that is particularly pertinent to this invention.

Prior art generally relates to apparatus as described in the above background section wherein the wheels/axle subframe remains in frictional sliding contact with the relatively moveable supporting elements during the forward or rearward movement of the removable portion relative to the trailer bed. Obviously, the coefficient of sliding friction between the moveable elements relative to the stationary elements is a function of the mass, area in contact and the condition of the surfaces involved.

Most prior patents relate to earth supported tracks having chocks thereon for retarding movement of the trailer rear wheels in a forward or rearward direction while adjusting their position relative to the trailer or to electrical or electronic sensing means enabling the driver to withdraw and reinsert the slider locking pins during the rear wheel adjustment action.

Of interest are the U.S. Pats. to Massey U.S. Pat. No. 3,963,259 and Landoll U.S. Pat. No. 4,125,198.

To achieve the rear wheel sliding action relative to the trailer Massey mounts the trailer bed on trailer wheel subframe supported V-pulleys which obviously reduces the coefficient of sliding friction of the trailer undercarriage relative to the trailer bed.

The Landoll patent similarly mounts rollers on his undercarriage engaged by inclined surfaces on his trailer bed support rails which permit rearward longitudinal movement of the trailer bed relative to its undercarriage for a rearward downwardly inclined position of the trailer bed for loading and unloading the trailer.

This invention is distinctive over both of the above patents and other prior art by providing a series of ramp climbing rollers mounted in his rear wheel subframe which move upwardly and temporarily lift the trailer bed overlying portion relative to the wheel subframe in a frictional reducing action permitting the trailer bed to be easily moved in either a forward or rearward direction. After adjusting the position of the trailer subframe the rollers therein are retracted to an out-of-contact position relative to the trailer bed rails.

SUMMARY OF THE INVENTION

A rear wheel subframe, formed by a pair of box channels, overlie and is supported by the trailer rear wheel spring and shackle assembly. The box channels are nested by rails overlying a trailer bed. Each box channel is provided with longitudinally spaced openings in its top surface exposing pairs of rollers journalled by roller carriages longitudinally moveable relative to the respective subframe box channel. The rollers are forced up wedge-like inclined ramps mounted on the inner surface of the bottom limit of the respective box channel which forces the companion carriage rollers into lifting supporting contact with the overlying trailer bed rail during movement of the trailer bed relative to the rear wheel subframe. Movement of the roller carriages in an opposite direction rolls the rollers out of lifting contact of the trailer rails. Locking pins, extending horizontally through the trailer rails and box channel walls are disengaged and reinserted before and after the adjustment of the wheels relative to the trailer.

The principal object of this invention is to provide a roller assembly interposed between a trailer rear wheel and axle assembly and a trailer bed for reducing the sliding friction contact between the rear wheel sliding assembly and the overlying trailer bed when adjusting one relative to the other.

DESCRIPTION OF THE PREFERRED EMBODIMENTS

Figure 1:
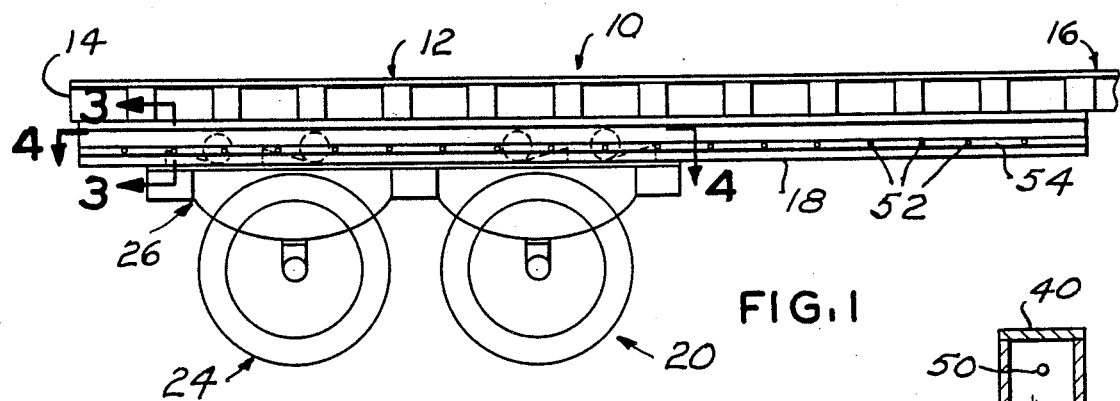
FIG. 1 is a fragmentary side elevational view of the rearward end portion of a flat bed trailer coupled behind a truck tractor, not shown.
Figure 2:
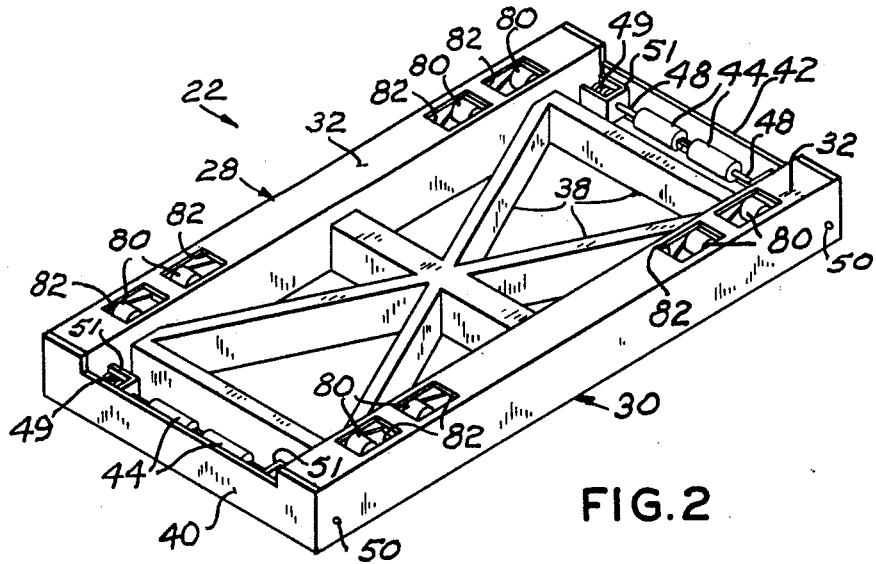
FIG. 2 is a perspective view, to a different scale, of the rear wheel sliding frame, per se.

Like characters of reference designate like parts in those figures of the drawings in which they occur.

Figure 3:
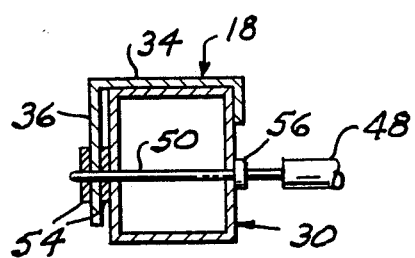
FIG. 3 is a vertical cross sectional view, to a larger scale, taken substantially along the line 3—3 of FIG. 1.
Figure 6:
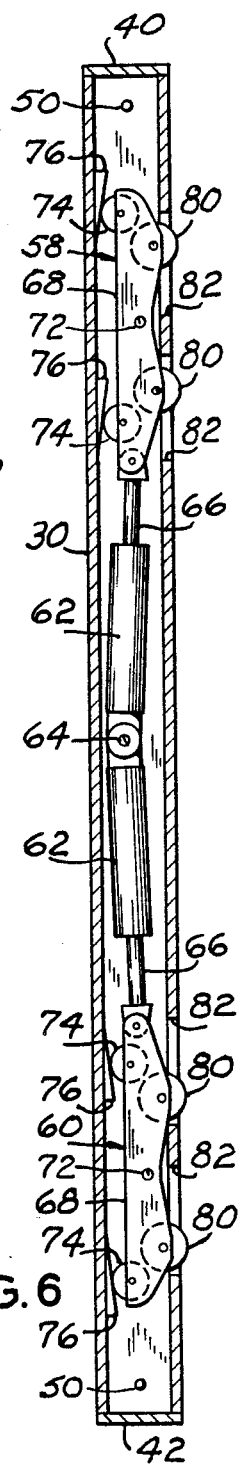
Figures 4, 5:
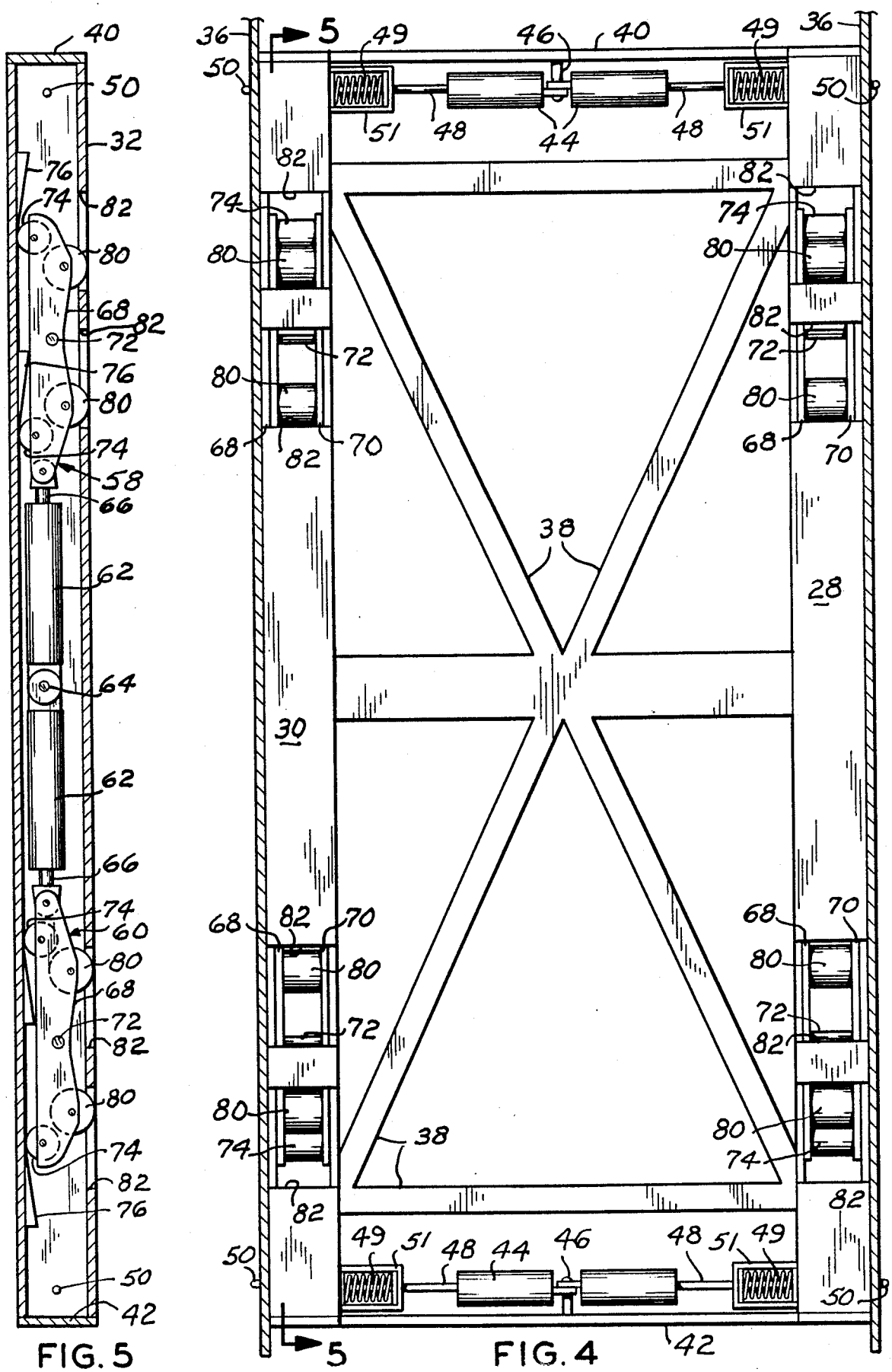
FIG. 4 is a horizontal sectional view, to an enlarged scale, taken substantially along the line 4—4 of FIG. 1, illustrating the sliding frame of FIG. 2 in top plan view.
FIG. 5 is a vertical cross sectional view taken substantially along the line 5—5 of FIG. 4 illustrating the trailer bed lifting rollers in retracted position; and, FIG. 6 is a view similar to FIG. 5, to a slightly smaller scale, illustrating the trailer bed lifting rollers to trailer lifting position.

In the drawings:

The reference numeral 10 indicates a flat bed trailer having an elongated horizontal bed 12 defined by a rearward end 14 and forward end portion 16 overlying a pair of elongated laterally spaced parallel substantially inverted L-shaped rails 18 (FIG. 3) overlying a trailer undercarriage 20.

The undercarriage 20 includes a generally rectangular sliding frame 22 joining the undercarriage to the trailer rails 18, in the manner presently explained, with the frame 22 horizontally overlying tandem wheels and axles 24, only two wheels being shown, joined to the depending limit of the frame 22 in a conventional manner by a spring and shackle assembly 26.

The sliding frame 22 comprises laterally spaced tubular or box members 28 and 30 preferably substantially square in transverse section and each having an upper surface 32 normally in contiguous supporting contact with the overlying depending surface of the foot portion 34 of the trailer rails 18. The leg portion 36 of each rail is disposed on the laterally outward surface of the respective box members 28 and 30 for the purposes presently explained.

The box members 28 and 30 are transversely joined by a plurality of cross braces 38 for rigidity. The respective end portion of the frame 22 includes a transverse web member 40 and 42. Inwardly of the respective web member, a pair of pressure cylinders 44 are mounted in end to end relation and anchored, as at 46, to the medial portion of the respective web. The rod 48 of the respective cylinder 44 is axially connected with an anchor pin 50 (FIG. 3) projecting through horizontal apertures in the respective end portion of the box members 28 and 30 for entering a selected one of a plurality of longitudinal openings 52 formed through the legs 36 of the trailer rails 18. Reinforcing strap members 54 are secured to opposing side surfaces of the rail legs 36 and similarly provided with openings aligned with the openings 52. A spring 49, surrounding the pin 50 or cylinder rod 48 and contained by a bracket 51 secured to the adjacent wall of the respective box member, normally biases the pins 50 into the apertures 52 to prevent unauthorized retraction of the pins. A stop 56, secured to each pressure cylinder pin forming rod, limits outward movement of the pins 50.

Pairs of pressure cylinder operated roller carriage means 58 and 60 are positioned in longitudinally spaced relation within each of the box members 28 and 30. Since each of the cylinder operated carriage means are identical, only the pair 60 will be described in detail in the interest of brevity. The other pair of carriage means 58 being equal and opposite and operated in unison with the pair of carriage means 60.

The carriage means 60 comprises a carriage pressure cylinder 62 anchored at one end, as at 64, medially the length of the box member 28 and 30 with its piston rod 66 pivotally connected with one end portion of a pair of laterally spaced carriage side members 68 and 70 joined in spaced-apart relation by a pin 72. A pair of base rollers 74 are journalled by the side members 68 and 70 adjacent their respective ends with a peripheral portion of each roller projecting below the horizontal plane formed by the depending limit of the side members.

A pair of wedge-shaped ramps 76 are secured to the inner surface of the bottom wall 78 of each box member 28 and 30 and project angularly upward at a selected angle in the path of movement of the rollers 74 when their cylinder rod 66 is extended for the purposes of elevating the carriage side members 68 and 70. Similarly, a pair of lifting rollers 88 are transversely journalled in fore to aft spaced relation by the carriage side members 68 and 70 adjacent the respective roller of the pairs of base rollers 74 with a peripheral portion of each roller 80 projecting above a horizontal plane defined by the upper limit of the carriage side members 68 and 70 a distance at least slightly greater than the thickness of the box member 28 and 30 top wall defining the frame top surface 32 for the purpose of contacting the under surface of the rail foot portion 34 and lifting the respective rail relative to the upper surface 32 of the box members 28 and 30. To facilitate this lifting movement of the rollers 80, the walls forming the top surface 32 of the box members 28 and 30 are longitudinally apertured to form pairs of apertures 82 cooperatively overlying the position of the respective rail lifting roller 80.

The power cylinders 44 and 62 are connected with the truck tractor air brake pressure supply or with an onboard hydraulic system, neither of which are shown, through conventional controls either at the trailer rear wheel assembly or in the truck cab.

OPERATION

When it is desired to adjust the position of the trailer wheels relative to the trailer bed, the brakes, not shown, are "set" and the locking pin cylinders 44 are actuated for retracting the pins 50 out of box member locking relation with the trailer tracks 18. The respective pairs of pressure cylinders 62 are then simultaneously activated to extend their piston rod 66 and move the roller carriages 58 and 60 in opposing longitudinal directions. The carriage means lower pairs of rollers 74 moving up the incline of the ramps 76 move the upper pairs of carriage rollers 80 through the box member openings 82 into lifting contact with the bottom surface of the trailer rails foot portion 34. The tractor trailer may then move the trailer bed in a longitudinal, forward or rearward direction relative to the wheel brake locked position of the undercarriage 20. Visually observing the position of the rail track apertures 52 relative to the end of the retracted pins 50 assists the operator in achieving alignment of the apertures with the pins so that the spring 49 may initially start the pin 50 into the aperture 52 and the pin cylinders 44 may be activated in a pin extended direction for locking the undercarriage with the trailer rails.

Obviously the invention is susceptible to change or alterations without defeating its practicability. Therefore, I do not wish to be confined to the preferred embodiment shown in the drawings and described herein.

I claim:

1. In a tractor-trailer unit having a rearward undercarriage longitudinally slidable relative to the trailer and characterized by a pair of parallel elongated box members underlying the rearward portion of the trailer bed, the horizontal top wall of each box member end portion having pairs of longitudinally spaced openings, the improvement comprising:

a pair of elongated parallel tracks, inverted L-shape in transverse section, longitudinally underlying and secured to the respective lateral under side portion of said bed and nesting the uppermost and laterally outward surfaces of the respective said box member and normally supported by said box members;

roller carriage means including upper and lower pairs of longitudinally spaced-apart rollers disposed within each said box member for lifting and supporting said tracks relative to said box members when a circumferential portion of the uppermost pairs of rollers are disposed within the respective pairs of openings; and, power cylinder means operatively connected with said roller carriage means for longitudinally moving the latter relative to the box members and disposing circumferential portions of the uppermost pairs of rollers within the respective pair of openings.

2. The combination according to claim 1 and further including:

a wedge secured within each box member in the path of movement of the respective roller of said lowermost pairs of rollers,
  each said wedge having an upwardly inclined surface extending longitudinally of the lowermost pairs of rollers.

3. The combination according to claim 2 and further including:

pin means projecting through said tracks and at least one wall of said box members for normally preventing longitudinal movement of said under carriage relative to the tracks.

4. In a tractor-trailer unit having an undercarriage longitudinally slidable relative to the trailer comprising a frame defined by a pair of parallel elongated box members underlying the rearward portion of the trailer bed, the horizontal top wall of each box member having pairs of longitudinally spaced openings, the improvement comprising:

a pair of elongated tracks, inverted L-shape in transverse section, longitudinally underlying and secured to the lateral under side portions of said bed and nesting the uppermost and laterally outward surfaces of the respective said box member;

other carriage means longitudinally moveable within each said box member;

antifriction means supported by said other carriage means for entering the openings and lifting and supporting said tracks relative to said box members when the other carriage means is moved in one direction; and, power cylinder means operatively connected with said other carriage means for longitudinally moving the latter relative to the box members.

5. The combination according to claim 4 in which the antifriction means includes:

vertically spaced pairs of rollers.

6. The combination according to claim 5 and further including:

wedges secured within each box member in the path of movement of the respective lowermost pairs of rollers, each said wedge having an upwardly inclined surface extending longitudinally of the respective box member.

7. The combination according to claim 6 and further including:

pin means projecting through said tracks and at least one wall of each said box member for normally preventing movement of said under carriage relative to the tracks.

8. The combination according to claim 7 and further including:

other power means operatively connected with said pin means for extending and retracting the pin means.

* * * * *